United States Patent
Reiter et al.

(10) Patent No.: US 6,212,279 B1
(45) Date of Patent: Apr. 3, 2001

(54) METHOD OF ELLIPTIC CURVE CRYPTOGRAPHIC KEY EXCHANGE USING REDUCED BASE TAU EXPANSION IN NON-ADJACENT FORM

(75) Inventors: Robert W. Reiter, Woodbine; Jerome A. Solinas, Westminster, both of MD (US)

(73) Assignee: The United States of America as represented by the United States National Security Agency, Washington, DC (US)

( * ) Notice: Subject to any disclaimer, the term of this patent is extended or adjusted under 35 U.S.C. 154(b) by 0 days.

(21) Appl. No.: 09/120,800

(22) Filed: Jul. 23, 1998

Related U.S. Application Data (63) Continuation-in-part of application No. 09/105,071, filed on Jun. 26, 1998, now abandoned.

(51) Int. Cl.[7] .................................. H04L 9/08; H04L 9/30
(52) U.S. Cl. .............................................. 380/278; 380/285
(58) Field of Search ..................................... 380/278, 283, 380/285

(56) References Cited

U.S. PATENT DOCUMENTS

| 4,200,770 | 4/1980 | Hellman et al. . |
| 4,567,600 | 1/1986 | Massey et al. . |
| 4,587,627 | 5/1986 | Omura et al. . |

(List continued on next page.)

OTHER PUBLICATIONS

Blake et al, Elliptic Curves in Cryptography, 1999, Cambridge, London Mathematical Society Lecture Note Series 265, p. 76.*

Solinas, An Improved Algorithm for Arithmetic on a Family of Elliptic Curves, 1997, CRYPTO '97 (Springer), pp. 357–371.*

Meier et al, Efficient Multiplication on Certain Nonsupersingular Elliptic Curves, 1992, CRYPTO '92 (Springer), pp. 333–344.*

Koblitz, CM–Curves with Good Crytographic Properties, 1991, CRYPTO '91 (Springer), pp. 279–287.*

Weyl, Algebraic Theory of Numbers, 1940, pp. 94–97.*

Weisstein, The CRC Concise Encyclopedia of Mathematics, 1998, p. 1295.*

Willi Meier, Othmar Staffelbach, "Efficient Multiplication on Certain Nonsupersingular Elliptic Curves," CRYPTO '92, 1992 pp. 333–344.

(List continued on next page.)

*Primary Examiner*—Gail Hayes
*Assistant Examiner*—Jeffrey Scott Leaning
(74) *Attorney, Agent, or Firm*—Robert D. Morelli (57) ABSTRACT

A method of cryptographic key exchange by two users agreeing on an elliptic curve of the form $y^2+xy=x^3+ax^2+1$, where "a" is a member of a field $F_2$, where the elliptic curve is defined over a field $F_2m$, where m is an integer; agreeing on a point G as the base point of the elliptic curve, where the point G is of order q, and where q is an integer; generating a private integer $x_A$ by a first user; reducing $x_A$ by mod $(\tau^m-1)$ in the form of $w+z\tau$ by the first user; generating a base tau expansion, in non-adjacent form, of the modular reduced $x_A$ by the first user; multiplying G by the base tau expansion of the modular reduced $x_A$; transmitting the product to the second user; receiving, by the first user, a value $y_B$ from the second user that is based on a private integer $x_B$ of the second user, where the received value is computed in a similar manner as was the product transmitted to the second user; multiplying, by the first user, $x_A$ by the value received from the second user in order to form a common secret point; multiplying, by the second user, $x_B$ by the value received from the first user in order to form the common secret point; and the two users each deriving the same cryptographic key from the common secret point.

9 Claims, 6 Drawing Sheets

U.S. PATENT DOCUMENTS

| | | |
|---|---|---|
| 5,159,632 | 10/1992 | Crandall . |
| 5,271,061 | 12/1993 | Crandall . |
| 5,272,755 | 12/1993 | Miyaji et al. . |
| 5,351,297 | 9/1994 | Miyaji . |
| 5,463,690 | 10/1995 | Crandall . |
| 5,737,424 | 4/1998 | Elteto et al. . |
| 5,761,305 | 6/1998 | Vanstone et al. . |

OTHER PUBLICATIONS

Francois Morain, Jorge Olivos, "Speeding Up the Computations on an Elliptic Curve Using Addition–Subtraction Chains," Sep. 12, 1990, "Theoretical Informatics and Applications", vol. 24, No. 6, 1990 pp. 531–544.

Neal Koblitz, "CM–Curves With Good Cryptographic Properties," CRYPTO '91, pp. 279–287.

* cited by examiner

METHOD OF ELLIPTIC CURVE CRYPTOGRAPHIC KEY EXCHANGE USING REDUCED BASE TAU EXPANSION IN NON-ADJACENT FORM

This is a continuation-in-part of U.S. patent application Ser. No. 09/105,071, filed on Jun. 26, 1998, now abandoned.

FIELD OF THE INVENTION

This invention relates to cryptography and, more particularly, to a discrete logarithm based key exchange on an elliptic curve using a reduced base tau expansion in non-adjacent form.

BACKGROUND OF THE INVENTION

U.S. Pat. No. 4,200,770, entitled "CRYPTOGRAPHIC APPARATUS AND METHOD," discloses a device for and method of performing a cryptographic key exchange over a public channel. The method is often called a public-key key exchange method or the Diffie-Hellman key exchange method after the first two named inventors of U.S. Pat. No. 4,200,770. U.S. Pat. No. 4,200,770 is hereby incorporated by reference into the specification of the present invention.

The cryptographic strength of the Diffie-Hellman key exchange method is based on the apparent intractability of finding a discrete logarithm, or discrete log, under certain conditions. Simply, two users exchange information by concealing their information using the mathematical technique of exponentiation. The users then mathematically combine the information they receive to the information they have to a key. The key may then be used with an encryption algorithm to encrypt a message. This method of establishing a private key between two users using a public channel solves the key distribution problem.

In order for an adversary to recover the concealed information and, therefore, be able to construct the key and decrypt messages sent between the two users, the adversary must be able to perform the inverse of exponentiation (i.e., a logarithm). There are mathematical methods for finding a discrete logarithm (e.g., the Number Field Sieve), but these algorithms cannot be done in any reasonable time using sophisticated computers if certain conditions are met during the construction of the key (e.g., the numbers involved in establishing the key are big enough).

More precisely, the cryptographic strength of the Diffie-Hellman key exchange method is based on the difficulty of computing discrete logs in a finite cyclic group. Mathematically, the discrete log problem is as follows. Let G be a finite cyclic group of order q, where g is a generator of G. Let r be a secret number such that $0<r<q$. Given G, q, g, and g^r, where "^" denotes exponentiation, find r, where r is the discrete logarithm, or discrete log, of g^r. The discrete log problem is to find r.

In a Diffie-Hellman key exchange, two users (e.g., User A and User B) agree on a common G, g, and q. User A generates, or acquires, a secret number "a", where $1<a<q$, computes g^a, and sends g^a to User B. User B generates, or acquires, a secret number "b", where $1<b<q$, computes g^b, and sends g^b to User A. User A then computes (g^b)^a, while User B computes (g^a)^b. Since these two values are mathematically equivalent, the two users are now in possession of the same secret number. A cryptographic key may then be derived from the secret number. The significance of this method is that a private key was established between two users by transmitting information over a public channel (i.e., an adversary sees the information being passed) but without knowing a or b, the key cannot be constructed from the information that is passed over the public channel. If the users keep "a" and "b" private and the numbers used to generate the key are large enough so that g^(ab) cannot be mathematically derived from g^a and g^b then only the users know the key. In practice, the most common choice for G is the integers mod n, where n is an integer.

Large keys pose problems not only for the adversary but also for the users. Large keys require large amounts of computational power and require large amounts of time in order to generate and use the key. Cryptographers are always looking for ways to quickly generate the shortest keys possible that meet the cryptographic strength required to protect the encrypted message. The payoff for finding such a method is that cryptography can be done faster, cheaper, and in devices that do not have large amounts of computational power (e.g., hand-held smart-cards).

The choice of the group G is critical in a cryptographic system. The discrete log problem may be more difficult in one group and, therefore, cryptographically stronger than in another group, allowing the use of smaller parameters but maintaining the same level of security. Working with small numbers is easier than working with large numbers. Small numbers allow the cryptographic system to be higher performing (i.e., faster) and requires less storage. So, by choosing the right group, a user may be able to work with smaller numbers, make a faster cryptographic system, and get the same, or better, cryptographic strength than from another cryptographic system that uses larger numbers.

The classical choice for G in a Diffie-Hellman key exchange are integers mod n, where n is an integer as well. In 1985, Victor Miller and Neal Koblitz each suggested choosing G from elliptic curves. It is conjectured that choosing such a G allows the use of much smaller parameters, yet the discrete log problem using these groups is as difficult, or more difficult, than integer-based discrete log problems using larger numbers. This allows the users to generate a key that has the same, or better, cryptographic strength as a key generated from an integer G and is shorter than the integer-based key. Since shorter keys are easier to deal with, a cryptographic system based on a shorter key may be faster, cheaper, and implemented in computationally-restricted devices. So, an elliptic curve Diffie-Hellman key exchange method is an improvement over an integer-based Diffie-Hellman key exchange method.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point 0 called the point at infinity. The infinity point is the additive identity (i.e., the infinity point plus any other point results in that other point). For cryptographic purposes, elliptic curves are typically chosen with F as the integers mod p for some large prime number p (i.e., $F_p$) or as the field of 2^m elements (i.e., $F_2m$).

Multiplication or, more precisely, scalar multiplication is the dominant operation in elliptic curve cryptography. The speed at which multiplication can be done determines the performance of an elliptic curve method.

Multiplication of a point P on an elliptic curve by an integer k may be realized by a series of additions (i.e., kP=P+P+. . . +P, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize kP, where k=25 then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than m−1. The price for simplicity here is being off by 1. In this example, the doubles are 2P, 4P, 8P, and 16P. The doubles correspond to the bit locations in the binary expansion of 25 (i.e., 11001), except for the is bit. The doubles that correspond to bit locations that are 1s are then added along with P if the 1s bit is a 1. The number of adds equals the number of 1s in the binary expansion. In this example, there are three additions since there are three 1s in the binary expansion of 25 (i.e., 11001). So, 25P=16P+8P+P.

On average, there are m/2 1s in k. This results in m doubles and m/2 additions for a total of 3m/2 operations. Since the number of bits in k is always less than the value of k, the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

It is no more costly to do elliptic curve subtractions than it is to do elliptic curve additions. Therefore, a doubles and add approach to doing elliptic curve multiplication may be modified to include subtraction where appropriate. There are an infinite number of ways to represent an integer as a signed binary expansion. The negative is in a signed binary expansion indicate subtraction in a double/add/subtract method while the positive is in the signed binary expansion indicate addition in the double/add/subtract method. For example, 25 may be represented as an unsigned binary number 11001 (i.e., 16+8+1=25) or as one possible signed binary number "10-1001" (i.e., 32−8+1=25).

In an article entitled "Speeding Up The Computations On An Elliptic Curve Using Addition-Subtraction Chains", authored by Francois Morain and Jorge Olivos, published in *Theoretical Informatics and Applications*, Vol. 24, No. 6, 1990, pp. 531–544, the authors disclose an improvement to the double/add/subtract method mentioned above by placing a restriction on the signed binary expansion that results in fewer elliptic additions being required to do an elliptic curve multiplication and, therefore, increase the performance (i.e., speed) of elliptic curve multiplication. Messrs. Morain and Olivos proposed generating a signed binary expansion such that no two adjacent bit locations in the signed binary expansion are non-zero (i.e., two 1s, irrespective of polarity, may not be next to each other). Such a signed binary expansion is called a non-adjacent form (NAF) of a signed binary expansion. It has been shown that a NAF signed binary expansion is unique (i.e., each integer has only one NAF signed binary expansion) and contains the minimum number of 1s, irrespective of polarity. By minimizing the 1s, the number of additions is minimized. The improvement proposed by Messrs. Morain and Olivos still requires m doubles but only requires an average of m/3 additions for a total of 4m/3 elliptic curve operations. This is less than the 3m/2 elliptic curve operations required by the classical double and add method described above.

In an article entitled "CM-Curves With Good Cryptographic Properties", authored by Neal Koblitz, published in *Crypto '91*, 1991, pp. 279–287, the author discloses an improvement to the double/add/subtract method mentioned above by working in a particular family of elliptic curves (i.e., Koblitz Curves). Koblitz Curves are characteristic 2 curves of the form $$E_a: y^2 + xy = x^3 + ax^2 + 1, \text{ where a is a member of } F_2.$$

The group on which the key agreement is based is the group of $F_2m$-rational points on $E_a$, which is chosen to have a low complexity normal basis. To operate on such curves, the multiplier k is expanded in powers of a complex number as follows:

$$\tau = ((-1)^a + ((-7)^0.5))/2.$$

The expansion is referred to as a base tau expansions. Similar to the binary expansions, the tau-adic expansion requires the analog of a double for each term in the expansion and an add for each non-zero term in the expansion. A property of these curves and normal basis representation is that the analog of doubling can be performed by a circular shift of bits and is, effectively, free. U.S. Pat. Nos. 4,567,600, entitled "METHOD AND APPARATUS FOR MAINTAINING THE PRIVACY OF DIGITAL MESSAGES CONVEYED BY PUBLIC TRANSMISSION," and 4,587,627, entitled "COMPUTATIONAL METHOD AND APPARATUS FOR FINITE FIELD ARITHMETIC," each disclose the method of getting the analog of doubles for free, but neither of these patents disclose the method of the present invention. U.S. Pat. Nos. 4,567,600 and 4,587,627 are each hereby incorporated by reference into the specification of the present invention. A downside of the base tau expansion is that it is 2 m-bits long for a k that is m-bits long. Another downside to the base tau expansion is that the rule for getting a minimum number of non-zero terms that was used in the binary case does not work for the base tau expansion. On average, 3/8 of the base tau expansion is non-zero. Since the base tau expansion is 2 m-bits long, the total number of elliptic curve operations is expected to be (3/8)×2 m=3 m/4. This is less than the 4 m/3 elliptic curve operations required by the non-adjacent form (NAF) of the double/add/subtract method described above.

In an article entitled "Efficient Multiplication on Certain Nonsupersingular Elliptic Curves", authored by Willi Meier and Othmar Staffelbach, published in *Crypto '92*, 1992, pp. 333–343, the authors disclose an improvement to the base tau expansion described above. Messrs. Meier and Staffelbach disclose a method of generating a base tau expansion that is only m-bits long. They achieve this result by reducing k by $mod(\tau^m - 1)$ and multiplying P by the (k $mod(\tau^m - 1)$). One-half of the terms of this reduced base tau expansion is non-zero. So, the expected number of elliptic curve operations for the reduced base tau expansion is mx(1/2)=m/2. This is less than the 3 m/4 elliptic curve operations required by the non-reduced base tau expansion method described above.

U.S. Pat. No. 5,159,632, entitled "METHOD AND APPARATUS FOR PUBLIC KEY EXCHANGE IN A CRYPTOGRAPHIC SYSTEM"; U.S. Pat. No. 5,271,061, entitled "METHOD AND APPARATUS FOR PUBLIC KEY EXCHANGE IN A CRYPTOGRAPHIC SYSTEM"; U.S. Pat. No. 5,272,755, entitled "PUBLIC KEY CRYPTOSYSTEM WITH AN ELLIPTIC CURVE"; U.S. Pat. No. 5,351,297, entitled "METHOD OF PRIVACY COMMUNICATION USING ELLIPTIC CURVES"; U.S. Pat. No. 5,463,690, entitled "METHOD AND APPARATUS FOR PUBLIC KEY EXCHANGE IN A CRYPTOGRAPHIC SYSTEM"; U.S. Pat. No. 5,737,424, entitled "METHOD AND SYSTEM FOR SECURE DISTRIBUTION OF PROTECTED DATA USING ELLIPTIC CURVE SYSTEMS"; and U.S. Pat. No. 5,761,305, entitled "KEY AGREEMENT AND TRANSPORT PROTOCOL WITH IMPLICIT SIGNATURES," each disclose a cryptographic method involving a key exchange method on an elliptic curve based on the discrete log problem, but none of these patents disclose a key exchange method that minimizes the number of elliptic curve operations as does the present invention. U.S. Pat. Nos. 5,159,632; 5,271,061; 5,272,755; 5,351,297; 5,463,690; 5,737,424; and 5,761,305 are hereby incorporated by reference into the specification of the present invention.

The present invention discloses an discrete log based key exchange method on an elliptic curve that requires fewer elliptic curve operations than the prior art methods listed above.

SUMMARY OF THE INVENTION

It is an object of the present invention to securely exchange a cryptographic key between two users over a public channel.

It is another object of the present invention to securely exchange a cryptographic key between two users over a public channel based on the discrete logarithm problem.

It is another object of the present invention to securely exchange a cryptographic key between two users over a public channel based on the discrete logarithm problem and on an elliptic curve.

It is another object of the present invention to securely exchange a cryptographic key between two users over a public channel based on the discrete logarithm problem and on an elliptic curve in a manner that minimizes the total number of elliptic curve operations for an elliptic curve multiplication. Elliptic curve multiplication is the operation that determines the efficiency (i.e., speed) of an elliptic curve cryptographic method such as the key exchange method of the present invention.

The present invention is a method of performing a discrete log based key exchange on an elliptic curve in a manner that requires the fewest total number of elliptic curve operations for an elliptic curve multiplication than any presently known method. The present method uses a reduced base tau expansion in non-adjacent form (NAF) on a Koblitz Curve to require only $m/3 \approx 0.33$ m total number of elliptic curve operations for an elliptic curve multiplication, where m is the number of bits in k, and where k in the multiplier of an elliptic curve point P (i.e., kP). This compares favorably with the repeated addition method described above which requires $k \approx 2^m$ total elliptic curve operations for an elliptic curve multiplication, the double and add method described above which requires $3m/2=1.5$ m operations, the non-adjacent form binary expansion method described above which requires $4m/3 \approx 1.33$ m operations, the base tau expansion on a Koblitz Curve method described above which requires $3m/4=0.75$ m operations, and the reduced base tau expansion on Koblitz Curves described above which requires $m/2=0.5$ m operations. Note that the steps of the non-adjacent form binary expansion do not apply to a base tau expansion. Therefore, the present method performs the basic elliptic curve operation with 33% fewer operations than the next best method presently known.

The first step of the present invention is for each user to acquire the same characteristic 2 elliptic Koblitz Curve defined as follows:

$$E_a: y^2 + xy = x^3 + ax^2 + 1,$$

where "a" is a member of field $F_2$. The key exchange is performed over the field $F_2$ m, where m is an integer.

The second step is for each user to acquire the same base point $G=(G_x, G_y)$ on the elliptic curve, where G is of order q, and where each user knows the order q. $E_a$, G, and q may be publicly known parameters.

Each user performs the following steps. For economy of description, the steps will be described from the perspective of User A. Subscript A denotes User A and subscript B denotes User B. The steps that User A performs must also be performed by User B. The steps that User B must perform may be derived from the steps listed below by changing each user reference and subscript to the opposite user reference and subscript. That is, User A changes to User B, and visa versa, and subscript A changes to subscript B, and visa versa.

In the third step, User A generates a private integer $x_A$.

In the fourth step, User A reduces $x_A$ by modulo $(\tau^m-1)$, where $\tau=((-1)^a+((-7)^{0.5}))/2$.

In the fifth step, User A forms the base tau expansion, in non-adjacent form, of the reduced $x_A$.

In the sixth step, User A multiplies G by the base tau expansion, in non-adjacent form, of the reduced $x_A$.

In the seventh step, User A transmits the result of step six to User B.

In the eighth step, User A receives a value from User B that represents G multiplied by a base tau expansion, in non-adjacent form, of a private integer $x_B$ of User B in reduced form. The value transmitted by User B to User A is formed using the same steps described above but with User B's private integer $x_B$.

In the ninth step, User A multiplies the base tau expansion, in non-adjacent form, of the reduced $x_A$ by the value received from User B to form a common secret point.

In the tenth step, a cryptographic key is derived from the common secret point.

User B generates the same key by doing the steps described above, but with User B's private integer $x_B$. More precisely, the steps that User B must perform in order to generate the same cryptographic key that User A generated may be arrived at by changing the above user references and subscripts from User A to User B, and vice versa.

DETAILED DESCRIPTION

The present invention is a method of performing a discrete log based cryptographic key exchange on an elliptic curve in a manner that requires the fewest total number of elliptic curve operations for an elliptic curve multiplication than any presently known method. The present method uses a reduced base tau expansion in non-adjacent form (NAF) on a Koblitz Curve to require only m/3≈0.33 m total number of elliptic curve operations for an elliptic curve multiplication, where m is the number of bits in k, and where k is the multiplier of an elliptic curve point P (i.e., kP). This compares favorably with the repeated addition method described above which requires k≈2^m total elliptic curve operations for an elliptic curve multiplication, the double and add method described above which requires 3 m/2=1.5 m operations, the non-adjacent form binary expansion method described above which requires 4 m/3≈1.33 m operations, the base tau expansion on a Koblitz Curve method described above which requires 3 m/4=0.75 m operations, and the reduced base tau expansion on Koblitz Curves described above which requires m/2=0.5 m operations. Note that the steps of the non-adjacent form binary expansion do not apply to a base tau expansion. Therefore, the present method performs the basic elliptic curve operation with 33% fewer operations than the next best method presently known.

Figure 1:
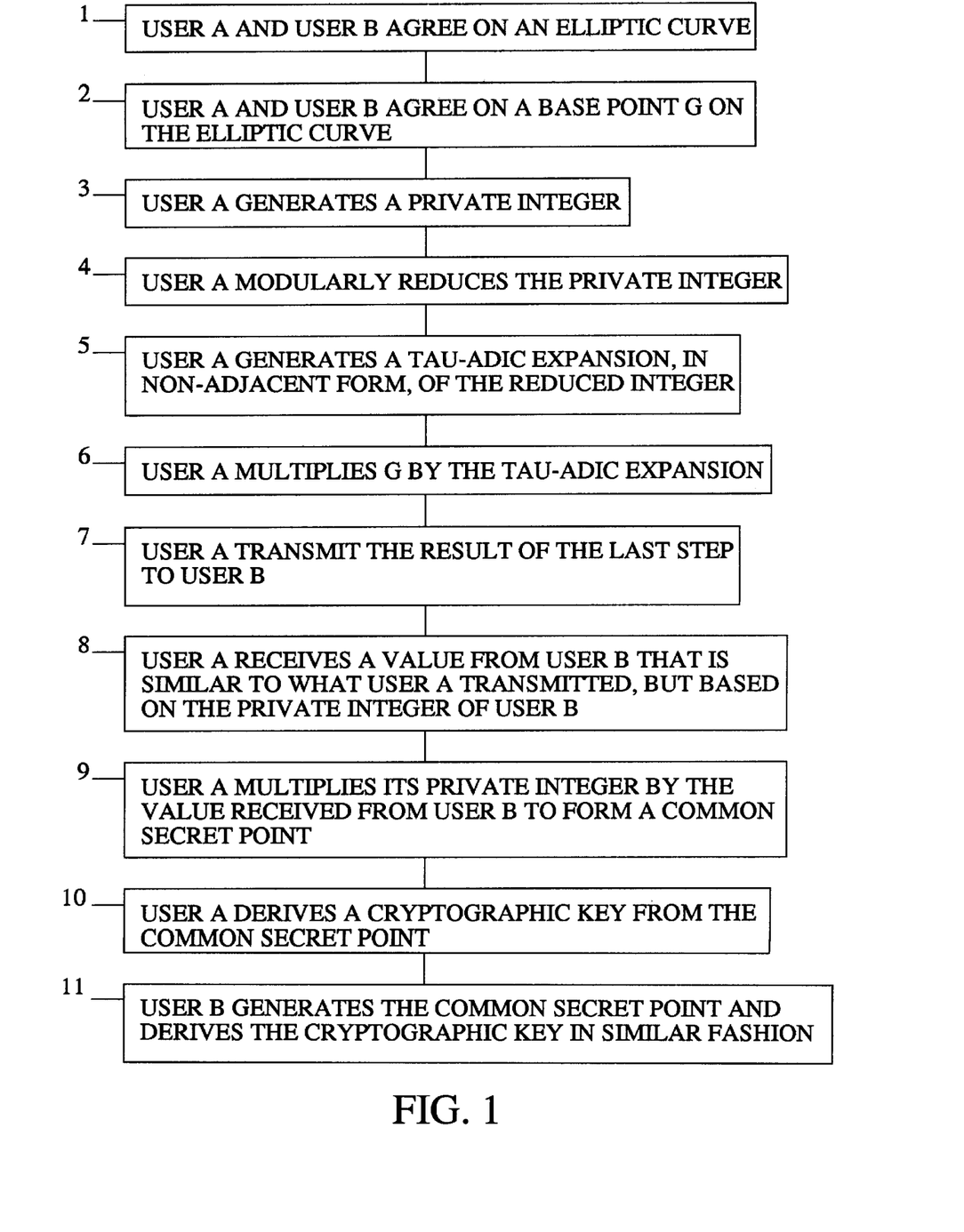
FIG. 1 is a list of steps of the present invention.

FIG. 1 is a list of steps for the method of the present invention. The first step 1 of the present method is for the two users (e.g., User A and User B) who wish to establish a cryptographic key between themselves over a public channel agree on a characteristic 2 elliptic Koblitz Curve defined as follows:

$$E_a : y^2 + xy = x^3 + ax^2 + 1,$$

where "a" is a member of field $F_2$. The key exchange is performed over the field $F_2$ m, where m is an integer.

The second step 2 of the present method is for the two users to agree on a base point $G=(G_x, G_y)$ on the elliptic curve, where G is of order q, and where each user knows the order q. $E_a$, G, and q may be publicly known parameters.

In the preferred embodiment, each user performs the following steps. For economy of description, the steps will be described from the perspective of User A. Subscript A denotes User A and subscript B denotes User B. The steps that User A performs must also be performed by User B, but with User B's private integer $x_B$, in order to generate the same cryptographic key that User A generates. The steps that User B must perform may be derived from the steps listed below by changing each user reference and subscript to the opposite user reference and subscript. That is, User A changes to User B, and visa versa, and subscript A changes to subscript B, and visa versa. In an alternate embodiment, only one user performs the steps of the present invention while the other user performs the standard steps of an elliptic curve key exchange method based on the discrete log problem. In the preferred embodiment, both users benefit by only having to perform the fewest number of elliptic operations of any method presently known while in the alternate embodiment, only the user performing the steps of the present method benefits.

The third step 3 of the present method is for User A to generate a private integer $x_A$. The following steps are performed in order to protect the private integer so that an adversary may not recover the private integer from information transmitted over a public channel and other public information. The elliptic curve analogue to integer exponentiation is used to protect the private integer. For an adversary to mathematically recover the private integer, the adversary must solve a discrete logarithm problem. Such a problem is considered intractable if the parameters used to protect the private integer meet certain characteristics (e.g., are long enough etc.). Elliptic curve multiplication is mathematically analogous to integer exponentiation.

The fourth step 4 of the present method is for User A to reduce $x_A$ by modulo $(\tau^m - 1)$, where $\tau = ((-1)^a + ((-7)^0.5))/2$. The exact steps of generating $(x_A \mod (\tau^m - 1))$ are described below and in FIG. 2 and FIG. 3.

The fifth step 5 of the present method as listed in FIG. 1 is for User A to form a base tau expansion, in non-adjacent form, of the reduced $x_A$. The exact steps of forming a base tau expansion in non-adjacent form are described below and in FIG. 4.

The sixth step 6 of the present method as listed in FIG. 1 is for User A to multiply the base point G by the base tau expansion, in non-adjacent form, of the reduced $x_A$. The exact details of the multiplication are described below and listed in FIG. 5.

The seventh step 7 of the present method as listed in FIG. 1 is for User A to transmit the result of step six 6 to User B.

The eighth step 8 of the present method is for User A to receive a value from User B that represents G multiplied by a base tau expansion, in non-adjacent form, of a private integer $x_B$ of User B in reduced form. The value transmitted by User B to User A is formed using the same steps described above but with User B's private integer $x_B$.

The ninth step 9 of the present method is for User A to multiply the base tau expansion, in non-adjacent form, of the reduced $x_A$ by the value received from User B to form a common secret point.

The tenth step 10 of the present method is to derive a cryptographic key from the common secret point.

In the preferred embodiment, the eleventh step 11 of the present method is for User B to generate the same common secret point by multiplying the base tau expansion, in non-adjacent form, of the reduced $x_B$ by the value received from User A and derive the same cryptographic key from the common secret point. More precisely, the steps that User B must perform in order to generate the same cryptographic key that User A generated may be arrived at by changing the above user references and subscripts in the steps performed by User A from User A to User B, and vice versa. In an alternate embodiment, only one user performs the steps of the present invention while the other user performs the standard steps of an elliptic curve key exchange method based on the discrete log problem. In the preferred method, both users benefit by having to perform the minimum number of elliptic operation of any presently known key exchange method while in the alternate embodiment, only the user performing the steps of the present method benefits so.

Figure 2:
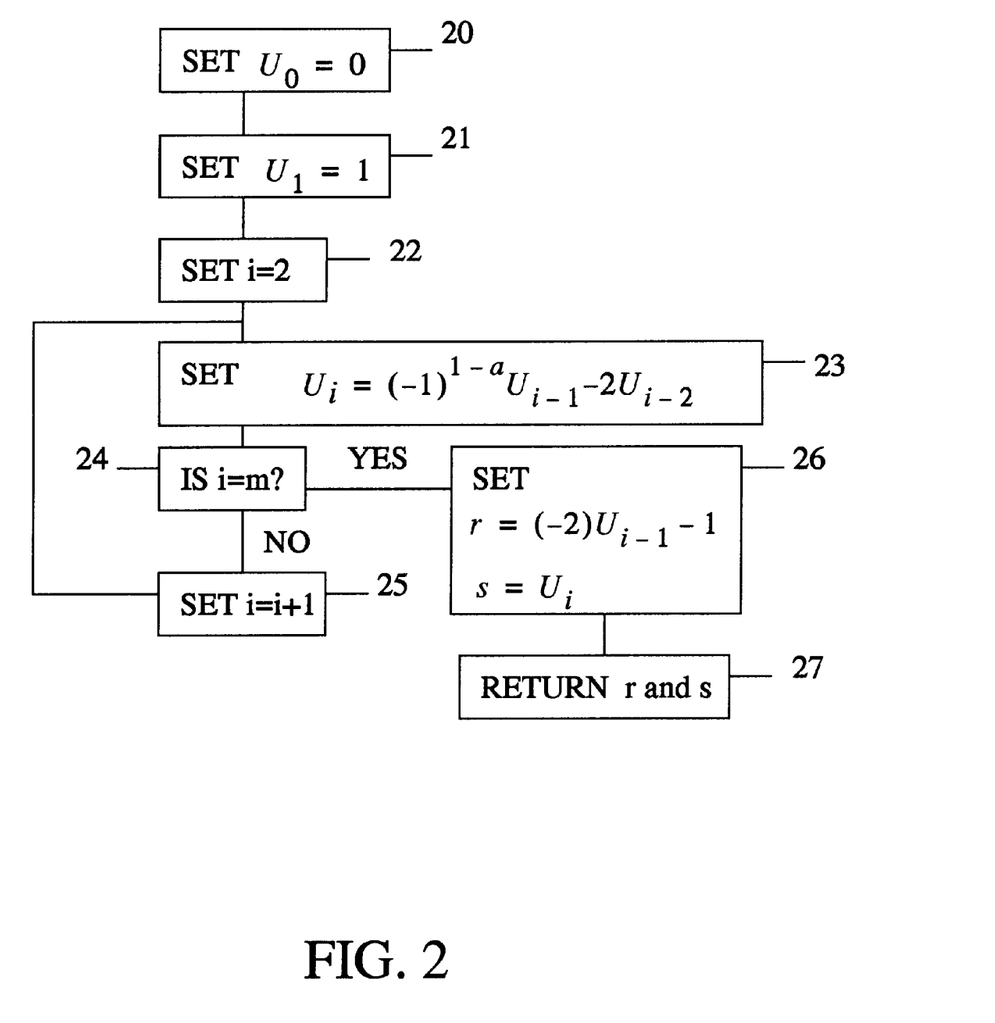
FIG. 2 is a list of steps of expressing $(\tau^m-1)$ as $r+s\tau$.

FIG. 2 lists some of the steps necessary to accomplish the step 4 of reducing $x_A$ by mod $(\tau^m - 1)$ listed in FIG. 1. The steps listed in FIG. 2 result in expressing $(\tau^m - 1)$ in the form of r+sτ.

The first step 20 listed in FIG. 2 is to set a parameter $U_0$ equal to zero.

The second step 21 listed in FIG. 2 is to set a second parameter $U_1$ equal to one.

The third step 22 listed in FIG. 2 is to set a third parameter i equal to two.

The fourth step 23 listed in FIG. 2 is change the value of the parameter $U_i$ according to the present value of i as follows:

$$U_i = (-1)^{1-a} U_{i-1} - 2 U_{i-2},$$

where "a" is the parameter used to described the particular elliptic curve agreed to by the users (i.e., $y^2 + xy = x^3 + ax^2 + 1$).

The fifth step 24 in FIG. 2 is to determine whether or not parameter i is equal to m, where m is the integer used to define the field $F_2$ m of the agreed upon elliptic curve.

If parameter i is not equal to m then the next step 25 is to increment parameter i by one and return to the fourth step 23 for further processing.

If parameter i is equal to m then the next step 26 is to set $r = -2U_{i-1} - 1$ and set $s = U_i$.

The final step 27 in FIG. 2 is to generate and r and s.

Figure 3:
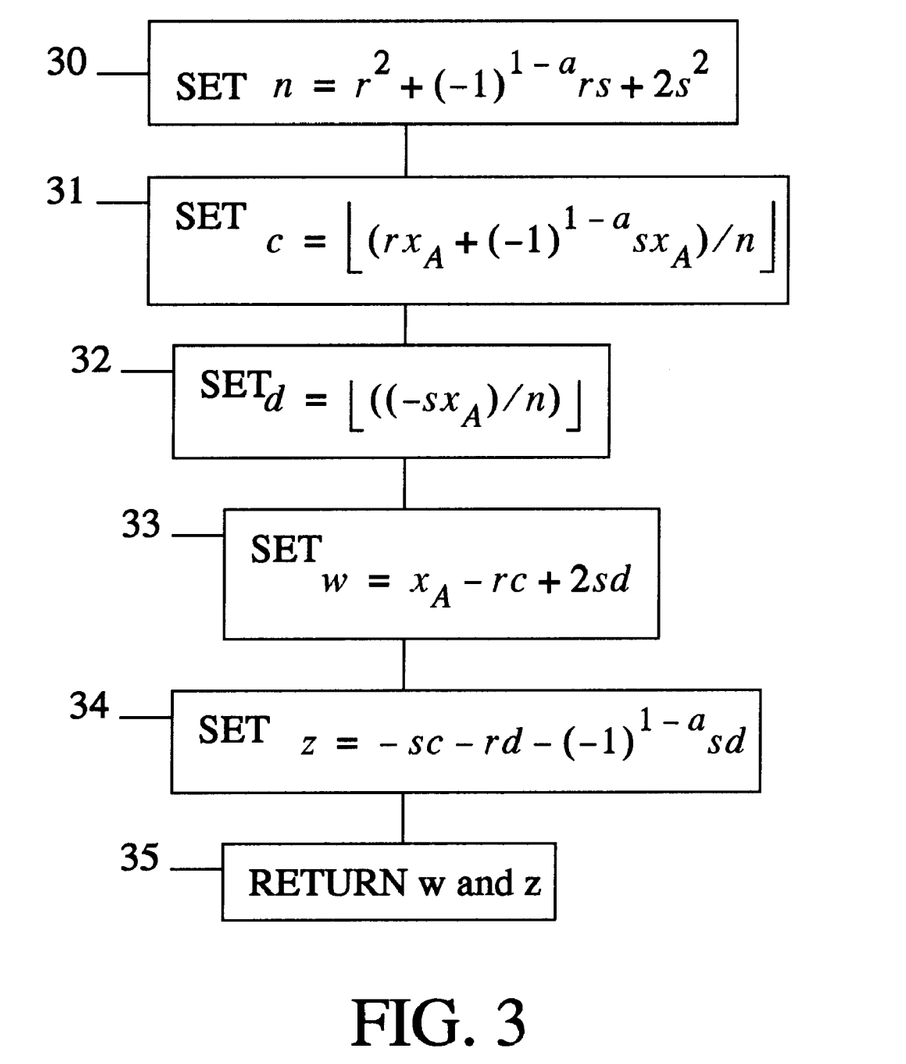
FIG. 3 is a list of the steps of reducing a private integer $x_A$.

FIG. 3 lists the remaining steps necessary to accomplish the step 4 listed in FIG. 1 of reducing $x_A$ by mod ($\tau^m - 1$), where ($\tau^m - 1$) = $r + s\tau$.

The first step 30 listed in FIG. 3 is to set $n = r^2 + (-1)^{1-a} rs + 2s^2$, where r and s resulted from the steps listed in FIG. 2, and where "a" is the parameter used to describe the particular elliptic curve agreed to by the users.

The second step 31 listed in FIG. 3 is to set $c = \lfloor (rx_A + (-1)^{1-a} sx_A)/n \rfloor$, where "$\lfloor\ \rfloor$" denotes the function that returns the maximum integer not larger than the value contained therein.

The third step 32 listed in FIG. 3 is to set $d = \lfloor -sx_A/n \rfloor$.

The fourth step 33 listed in FIG. 3 is to set $w = x_A - rc + 2sd$.

The fifth step 34 listed in FIG. 3 is to set $z = -sc - rd - (-1)^{1-a} sd$.

The sixth and last step 35 listed in FIG. 3 is to generate and put out w and z. Note that $w + z\tau$ represents the modular reduction of the private integer $x_A$ (i.e., ($x_A$ mod ($\tau^m - 1$))).

Figure 4:
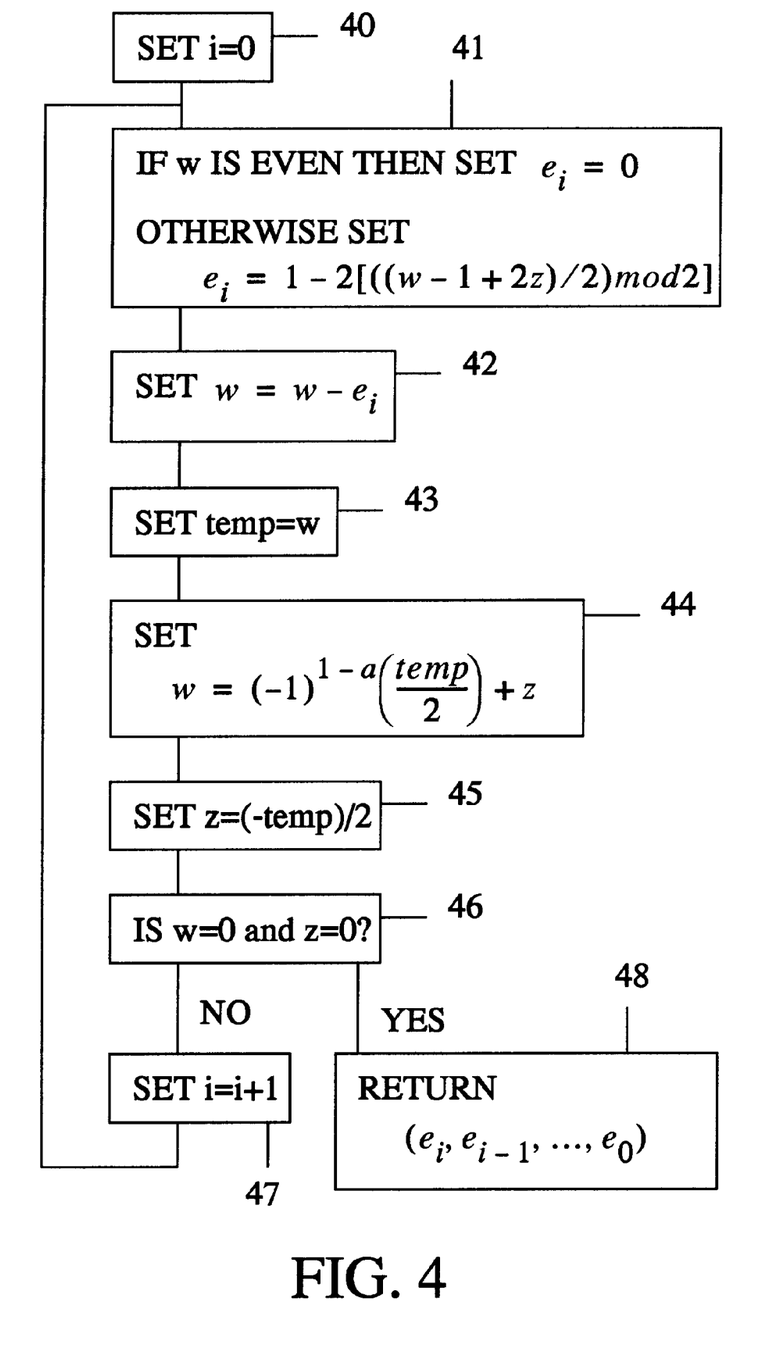
FIG. 4 is a list of the steps of representing the reduced private integer as a base tau expansion in non-adjacent form.

FIG. 4 lists the steps necessary to accomplish the step 5 listed in FIG. 1 of representing the modular reduction of $x_A$ as a base tau expansion in non-adjacent form.

The first step 40 in FIG. 4 is to set a parameter i equal to zero.

The second step 41 in FIG. 4 is to determine whether or not w is even. This second step 41 may be returned to as described below. If the second step 41 is returned to, w would have a different value than before as described below. If w is even then set $e_i = 0$, where $e_i$ represents the $i^{th}$ bit of the base tau expansion of $x_A$ in non-adjacent form. If w is not even then set $e_i = 1 - 2[((w - 1 + 2z)/2) \bmod 2]$.

The third step 42 in FIG. 4 is to set $w = w - e_i$.

The fourth step 43 in FIG. 4 is to set a temporary variable temp equal to w.

The fifth step 44 in FIG. 4 is to set $w = (-1)^{1-a}(\text{temp}/2) + z$.

The sixth step 45 in FIG. 4 is to set $z = (-\text{temp})/2$.

The seventh step 46 in FIG. 4 is to determine whether or not either w or z is not equal to zero.

If either w or z is not equal to zero then the eighth step 47 is to increment the parameter i by one.

If the parameter i was incremented by one then the next step 47 is to return to the second step 41 listed in FIG. 4 for further processing.

If both w and z are equal to zero then the last step 48 in FIG. 4 would be to put out the base tau expansion of the modular reduced $x_A$ in non-adjacent form (i.e., ($e_i, e_{i-1}, \ldots, e_0$)).

Figure 5:
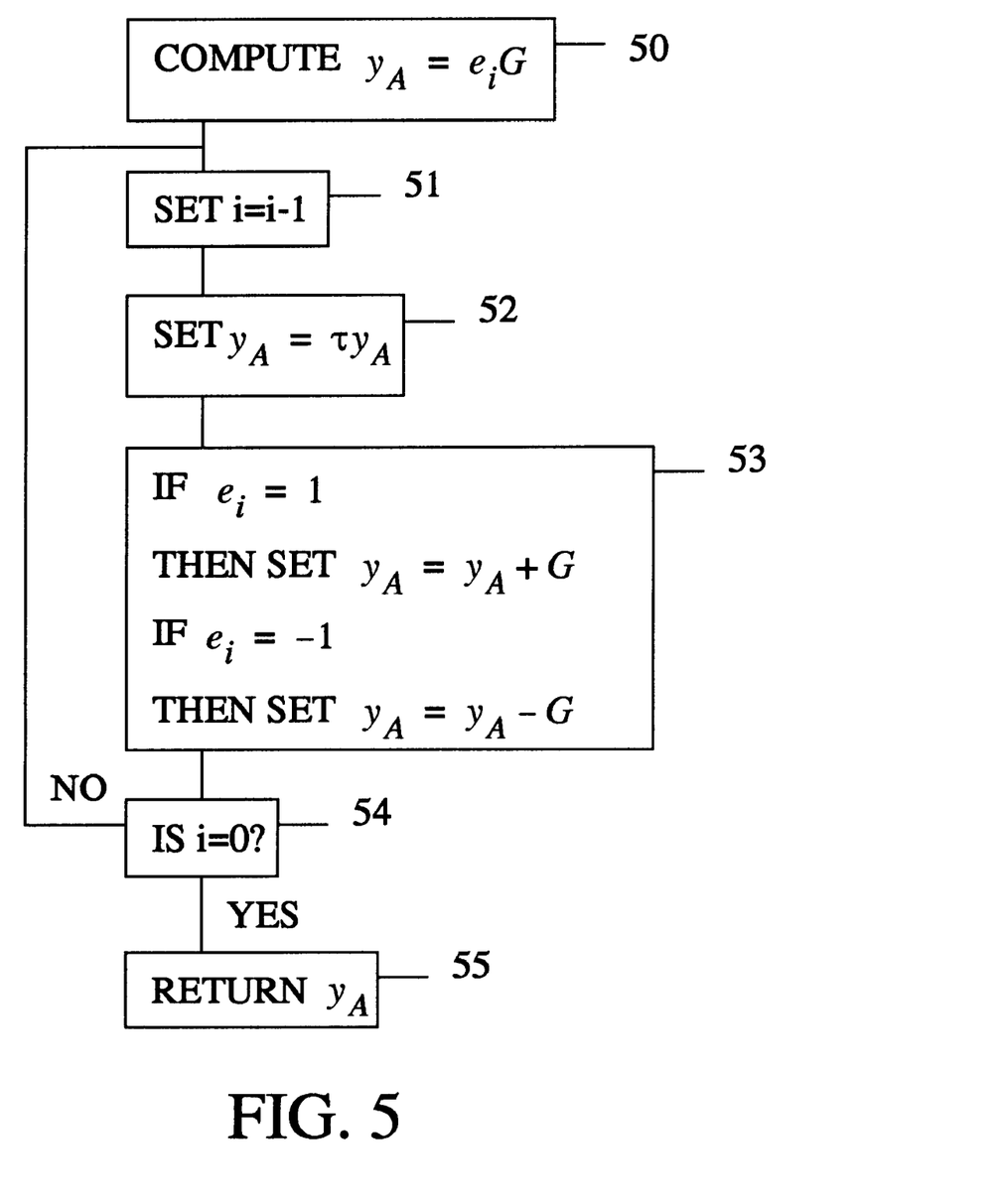
FIG. 5 is a list of steps of multiplying a point on an elliptic curve by the reduced private integer represented as a base tau expansion in non-adjacent form.

FIG. 5 lists the steps necessary to accomplish the step 6 listed in FIG. 1 of multiplying the point G by the base tau expansion, in non-adjacent form, of the modular reduced $x_A$.

The first step 50 in FIG. 5 is to compute $y_A = e_i G$, where $e_i$ is the left-most bit of the result of the last step 48 listed in FIG. 4.

The second step 51 listed in FIG. 5 is to decrement the parameter i by one.

The third step 52 listed in FIG. 5 is to set $y_A = \tau y_A$. This step may be accomplished by a shift of $y_A$.

The fourth step 53 listed in FIG. 5 is to determine if $e_i$ is equal to one or minus one. If $e_i$ is equal to one then set $y_A = y_A + G$. If $e_i$ is equal to minus one set $y_A = y_A - G$.

The fifth step 54 listed in FIG. 5 is to determine whether or not the parameter i is equal to zero. If the parameter i is equal to zero then the next step is to return to the second step 51 listed in FIG. 5 for further processing. If the parameter i is equal to zero then the next and last step 55 listed in FIG. 5 is to output $y_A$.

Figure 6:
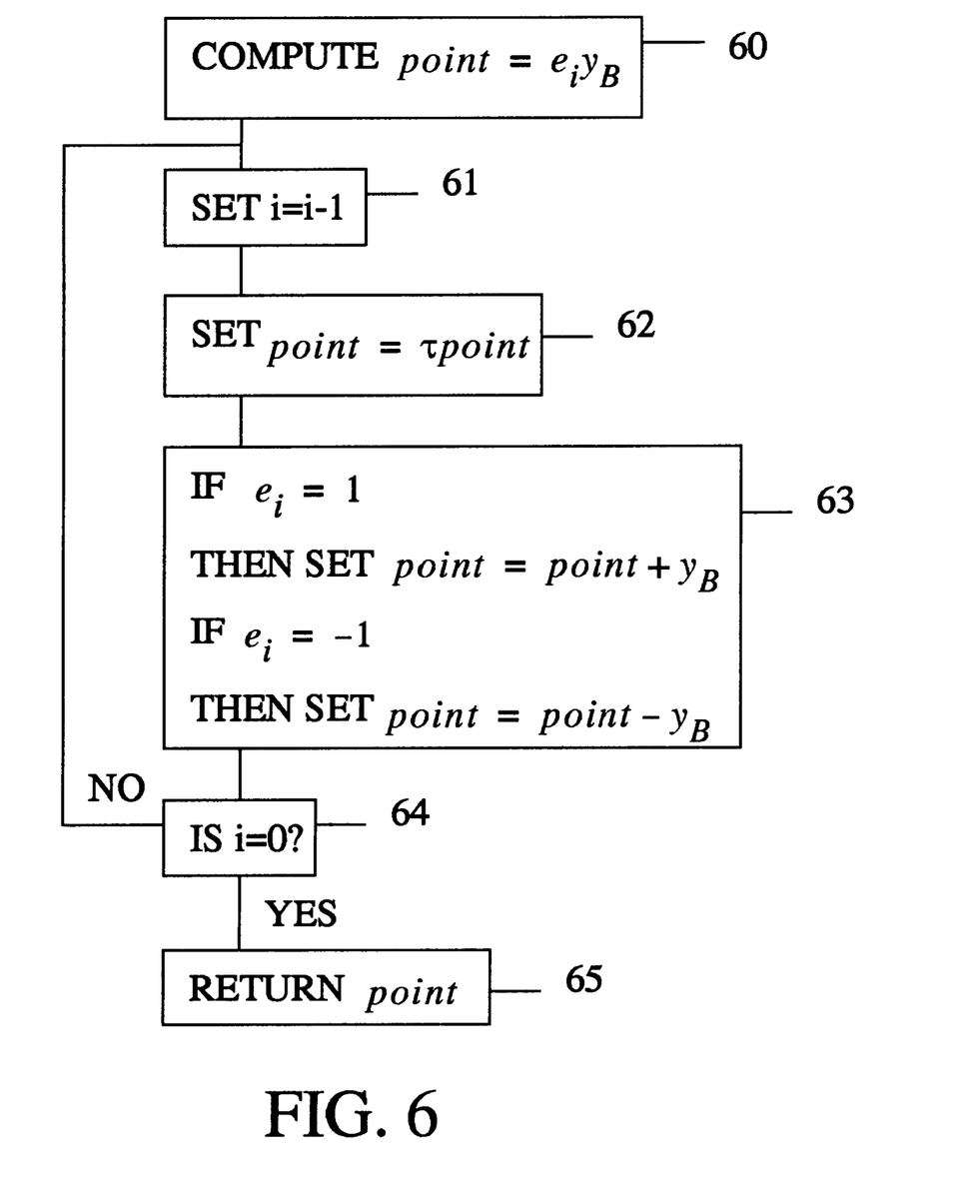
FIG. 6 is a list of steps of forming a common secret point from which a cryptographic key is derived.

FIG. 6 lists the steps necessary to accomplish the step 9 listed in FIG. 1 of multiplying $x_A$ by the value received from User B in order to form a common secret point.

The first step 60 in FIG. 6 is to set point = $e_i y_B$, where $e_i$ is the left-most bit of the result of the last step 48 listed in FIG. 4, and where $y_B$ is the value received from User B.

The second step 61 listed in FIG. 6 is to decrement the parameter i by one.

The third step 62 listed in FIG. 6 is to set point = $\tau$(point). This step may be accomplished by a shift of point.

The fourth step 63 listed in FIG. 6 is to determine if $e_i$ is equal to one or minus one. If $e_i$ is equal to one then set key = key + $y_B$. If $e_i$ is equal to minus one set point = point - $y_B$.

The fifth step 64 listed in FIG. 6 is to determine whether or not the parameter i is equal to zero. If the parameter i is equal to zero then the next step is to return to the second step 61 listed in FIG. 6 for further processing. If the parameter i is equal to zero then the next and last step 65 listed in FIG. 6 is to put out point as the common secret point. A cryptographic key may then be derived from the common secret point.

To generate the same common secret point, and derive therefrom the cryptographic key, User B, in the preferred embodiment, must perform the same steps performed by User A but with a private integer $x_B$ of User B rather than with User A's private integer $x_A$. The steps that User B must perform may be derived from the steps described above by changing each user reference and subscript to the opposite user reference and subscript. That is, User A changes to User B, and visa versa, and subscript A changes to subscript B, and visa versa. In an alternate embodiment, User B performs standard steps of an elliptic curve key exchange method based on the discrete log problem. In the preferred embodiment, both users benefit from the present invention by performing the fewest number of elliptic operations of any presently known elliptic curve key exchange method. In the alternate embodiment, only the user performing the steps of the present method benefits so.

Once the same common secret point is established between the two users, the two users may use the common secret point to derive the same cryptographic key than may then be used to encrypt messages or perform any other cryptographic function that requires a cryptographic key. Although the present invention is described using one particular method of cryptographic key exchange, the use of a base tau expansion, in non-adjacent form, of a modular reduced private integer may be used to improve any elliptic curve cryptographic key exchange method that relies on the discrete log problem for its security. Such cryptographic key exchange methods include Unified Model, MQV, and MTI.

What is claimed is:

1. A method of cryptographic key exchange, comprising the steps of:

a) agreeing upon an elliptic curve between a first user and a second user, where the elliptic curve is of the form $y^2+xy=x^3+ax^2+1$, where "a" is a member of a field $F_2$, where the elliptic curve is defined over a field $F_2$ m, where m is an integer;

b) agreeing upon a point G as the base point of the elliptic curve, where the point G is of order q, and where q is an integer;

c) generating a private integer $x_A$ by the first user;

d) reducing $x_A$ by mod ($\tau^m-1$) in the form of $w+z\tau$ by the first user;

e) generating a base tau expansion, in non-adjacent form, of the result of step (d) by the first user;

f) multiplying G by the result of step (e) by the first user;

g) transmitting, by the first user, the result of step (f) to the second user;

h) receiving, by the first user, a value $y_B$ from the second user that is based on a private integer $x_B$ of the second user, where the received value is computed in a similar manner as was the result of step (f);

i) multiplying, by the first user, $x_A$ by the value received from the second user in order to form a common secret point;

j) multiplying, by the second user, $x_B$ by the value received from the first user in order to form the common secret point; and k) deriving the cryptographic key from the common secret point by the first user and the second user.

2. The method of claim 1, wherein said step of reducing $x_A$ by mod ($\tau^m-1$) in the form of $w+z\tau$ by the first user is comprised of the steps of:

a) setting $U_0=0$;

b) setting $U_1=1$;

c) setting i=2;

d) setting $U_i=(-1)^{1-a}U_{i-1}-2U_{i-2}$;

e) determining whether or not i=m;

f) incrementing i by one and returning to step (d) for further processing if i≠m in step (e); and g) setting $r=-2U_{i-1}$, setting $s=U_i$, and putting out $r+s\tau$ if i=m in step (e).

3. The method of claim 2, further comprising the steps of, a) setting $n=\tau^2+(-1)^{1-a}rs+2s^2$;

b) setting c=_$(rx_A+(-1)^{1-a}sx_A)/n$_, where "_" denotes a function of returning the largest integer not larger than the value contained therein;

c) setting d=_$-sx_A/n$_;

d) setting $w=x_A-rc+2sd$;

e) setting $z=-sc-rd-(-1)^{1-a}sd$; and f) returning w and z.

4. The method of claim 3, wherein said step of generating a base tau expansion, in non-adjacent form, of the result of step (d) by the first user is comprised of the steps of:

setting i=0;

b) setting $e_i=0$ if w is even, otherwise setting $e_i=1-z$;

c) setting $w=w-e_i$;

d) setting temp=w;

e) setting $w=(-1)^{1-a}(temp/2)+z$;

f) setting $z=(-temp)/2$; and g) incrementing i by one and returning to stop (b) if both w and z are not equal to zero, otherwise putting out ($e_i, e_{i-1}, \ldots, e_0$) as the base tau expansion, in non-adjacent form, of the modular reduced private integer $x_A$.

5. The method of claim 4, wherein said step of multiplying G by the result of step (e) by the first user is comprised of the steps of:

a) computing $y_A=e_iG$;

b) decrementing i by one;

c) setting $y_A=\tau y_A$;

d) setting $y_A=y_A+G$ if $e_i=1$;

e) setting $y_A=y_A-G$ if $e_i=-1$; and f) returning to step (b) for further processing if i=0, otherwise putting out $y_A$ as the product of G and the base tau expansion, in non-adjacent form, of the modular reduced private integer $x_A$.

6. The method of claim 5, wherein said step of multiplying, by the first user, $x_A$ by the value received from the second user in order to form a common secret point is comprised of the steps of:

a) setting point=$e_iy_B$;

b) decrementing i by one;

c) setting point=$\tau$(point);

d) setting point=point+$y_B$ if $e_i=1$;

e) setting point=point+$y_B$ if $e_i=-1$; and f) returning to step (b) for further processing if i=0, otherwise returning point as the common secret point.

7. The method of claim 1, wherein said step of generating a base tau expansion, in non-adjacent form, of the result of step (d) by the first user is comprised of the steps of:

a) setting i=0;

b) setting $e_i=0$ if w is even, otherwise setting $e_i=1-z$;

c) setting $w=w-e_i$;

d) setting temp=w;

e) setting $w=(-1)^{1-a}(temp/2)+z$;

f) setting $z=(-temp)/2$; and g) incrementing i by one and returning to step (b) if both w and z are not equal to zero, otherwise putting out ($e_i, e_{i-1}, \ldots, e_0$) as the base tau expansion, in non-adjacent form, of the modular reduced private integer $x_A$.

8. The method of claim 1, wherein said step of multiplying G by the result of step (e) by the first user is comprised of the steps of:

a) computing $y_A=e_iG$;

b) decrementing i by one;

c) setting $y_A=\tau y_A$;

d) setting $y_A=y_A+G$ if $e_i=1$;

e) setting $y_A=y_A-G$ if $e_i=-1$; and f) returning to step (b) for further processing if i=0, otherwise putting out $y_A$ as the product of G and the base tau expansion, in non-adjacent form, of the modular reduced private integer $x_A$.

9. The method of claim 1, wherein said step of multiplying, by the first user, $x_A$ by the value received from the second user in order to form a common secret point is comprised of the steps of:

a) setting point=$e_iy_B$;

b) decrementing i by one;

c) setting point=$\tau$(point);

d) setting point=point+$y_B$ if $e_i=1$;

e) setting point=point+$y_B$ if $e_i=-1$; and f) returning to step (b) for further processing if i=0, otherwise returning point as the common secret point.

* * * * *